April 30, 1935.　　　　　F. REID　　　　　1,999,480
MECHANISM FOR APPLYING ADHESIVE TO CONTAINER SEALING FLAPS
Filed July 10, 1930　　　2 Sheets-Sheet 2

INVENTOR.
Forstus Reid
BY
ATTORNEYS

Patented Apr. 30, 1935

1,999,480

UNITED STATES PATENT OFFICE 1,999,480

MECHANISM FOR APPLYING ADHESIVE TO CONTAINER SEALING FLAPS

Forestus Reid, Cincinnati, Ohio, assignor to The Procter & Gamble Company, Cincinnati, Ohio, a corporation of Ohio Application July 10, 1930, Serial No. 466,974

9 Claims. (Cl. 91—12)

My invention relates to container sealing machines, and particularly to mechanism associated with a sealing machine by which adhesive, particularly silicate, is applied to the sealing flaps of the container.

In the art there has been considerable development in machines for applying adhesive to the sealing flaps of containers and mechanically folding over the flaps and passing the containers through pressure belts from which they emerge in completely sealed condition. While the use of silicate of soda has been attempted in connection with such sealing machines as an adhesive, to the best of my knowledge and belief no one has heretofore evolved a satisfactory mechanism for applying the adhesive which can be used in regular factory operation. In most plants, when silicate is used for sealing, it is applied with a brush, and the sealing flaps are then folded over and the container is passed through a pressure belt to give the silicate a change to dry.

One difficulty with the use of silicate as an adhesive medium has been that the mechanical devices for applying the silicate to the sealing flaps has either applied too much silicate, resulting in the adhesive flowing down and damaging the wrappers of the packages in the container, or too little silicate, in which case the flaps are not firmly secured.

It is the object of my invention to provide adhesive applying mechanism in association with a carrier belt and container sealing mechanism which will apply the adhesive in a sufficiently thick coating to predetermined portions of the sealing flaps, so that a thoroughly tight package will be provided, and so that the silicate will not flow down through the opening between the sealing flaps and cause damage to the wrappers of the packages in the container.

It is further my object to provide adhesive applying mechanism mechanically controlled so that it positively applies the adhesive to the container flaps in contrast to passing the flaps through mechanism in which the flaps come in contact with an adhesive applying device.

The above objects and other objects to which reference will be made in the ensuing description I accomplish by that certain combination and arrangement of parts of which I have illustrated a preferred modification.

In the drawings:—

Figure 1:
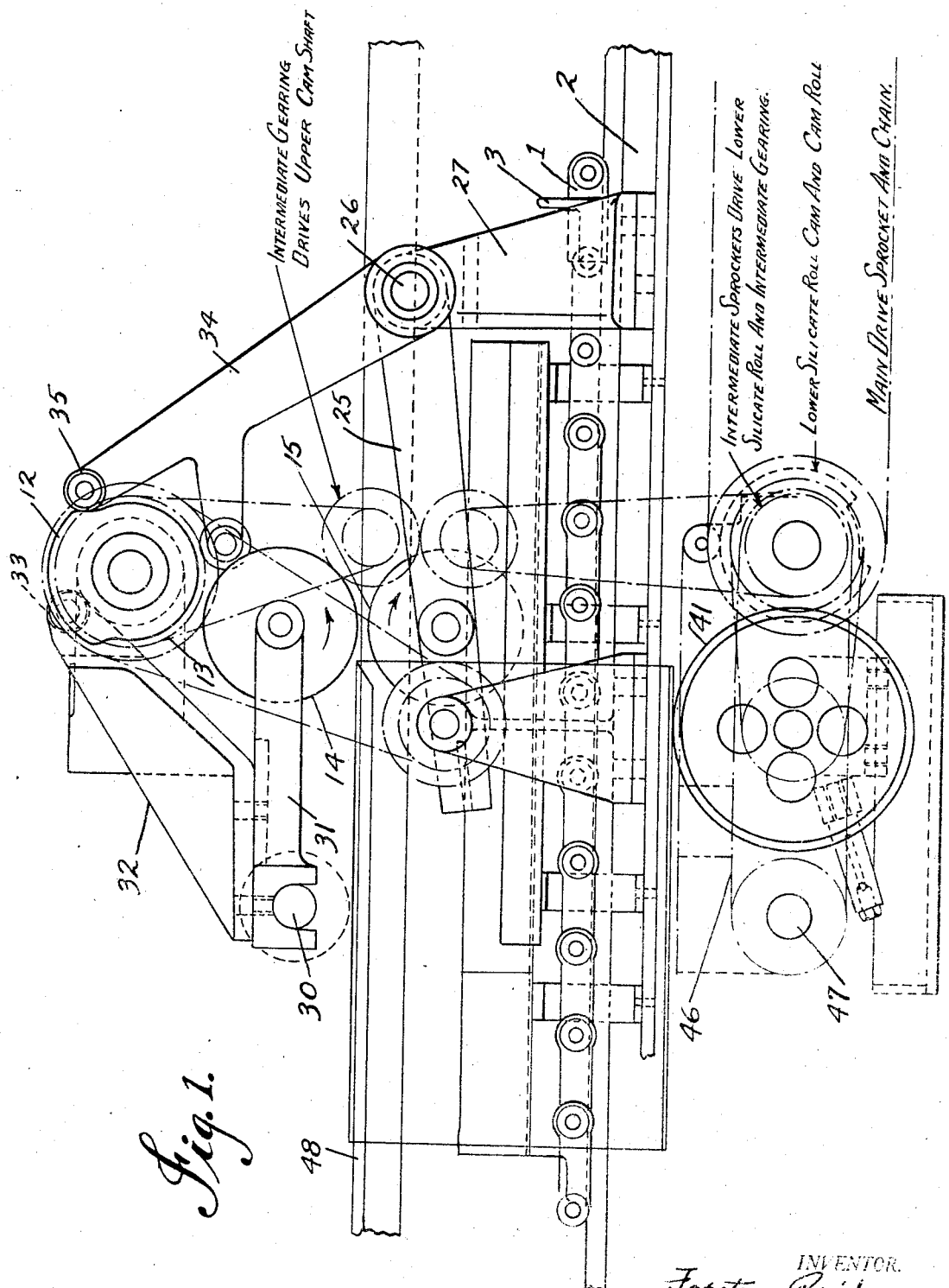
Figure 1 is a side elevation of the portion of the mechanism which applies the adhesive to predetermined areas on the sealing flaps.

Referring first to Figure 1, a link conveyor 1 moves along a carrier frame 2, and mechanically moves the containers through the sealing mechanism. The conveyor has pusher lugs 3 which bear against an end of the container and so push the container through the mechanism.

Figure 2:
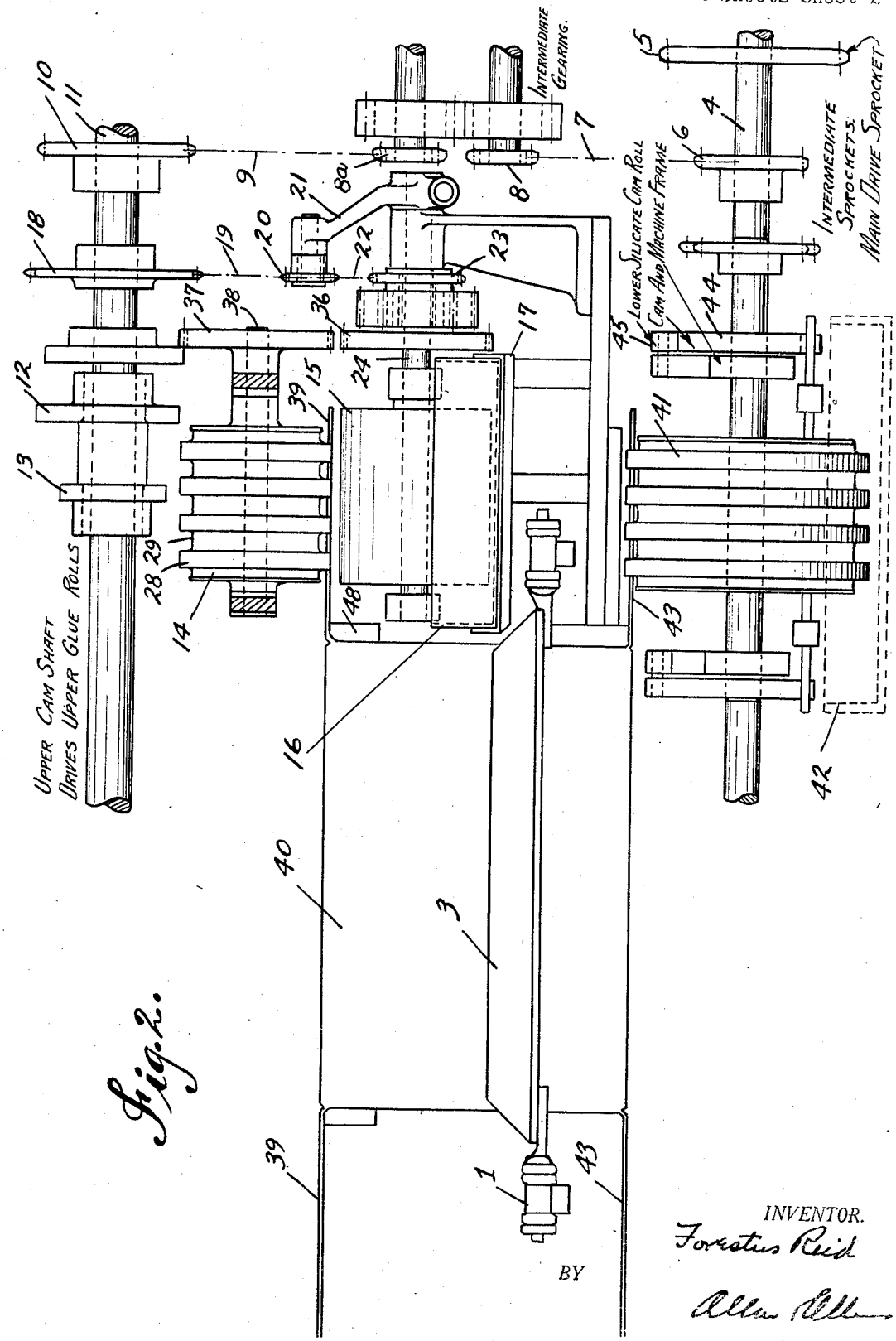
Figure 2 is an end elevation of one side of the adhesive applying mechanism, it being understood that the other side is of similar construction.

Referring to Figure 2, the main drive shaft for the sealing mechanism is indicated at 4. A sprocket 5 mounted on the shaft 4 may be provided with a chain (not shown) by which the shaft is rotated from any convenient source of power, such as an electric motor. On the shaft 4 I have indicated a driving sprocket 6 with a chain 7 (diagrammatically indicated), which rotates intermediate gearing indicated at 8, 8a. From the gear 8a a chain 9 (diagrammatically indicated) drives a sprocket 10 mounted on the upper cam shaft 11.

Referring now to both Figures 1 and 2, it will be noted that the shaft 11 carries two cams, indicated at 12, 13. The cam 13 controls the movement of the fluted silicate applying roller 14, and the cam 12 controls the movement of the adhesive supplying roller 15 which, it will be noted, is mounted in such position that it may be dipped into the silicate tank 16, which is mounted on frame members 17 extending up from the carrier frame.

A sprocket 18 through a chain 19 (diagrammatically indicated) actuates an idler sprocket 20 mounted on an adjustable bracket 21. Another chain 22 (also diagrammatically indicated) rotates a sprocket 23 on a shaft 24 which carries the adhesive supply roller 15. The shaft 24 is journalled in a frame 25 which is pivotally mounted, as indicated at 26, in a bracket 27 extending up from the carrier frame.

The roller 14 which, it will be noted, is of fluted construction having knurled annular disclike members 28 interspaced with loose or annular grooves 29, is pivotally mounted as indicated at 30 on an arm 31. The bell crank arm 32 which forms part of the arm 31 carries a roller 33 which is in peripheral contact with the cam 13. There is further a bell crank arm 34 which extends from the arm 25 and engages the surface of the cam 12.

Referring to Figure 1, it will be noted that when the roller 35, which controls the movement of the bell crank lever 25, 34, engages the high point of the cam 12, the supply roller 15 will be elevated from a position dipping within the tank 16. When the roller 35 engages the low point of the cam 12, the supply roller 15 will dip down into the tank 16. During the movement, under control of the cam 12, the roller 15 dips into the silicate supply tank and is then elevated into peripheral contact with the roller 14 when silicate is applied to the knurled annular surfaces 28 of the roller 14. In this position a gear 36, mounted on the shaft 24, engages a gear 37 which is mounted on a shaft 38 which carries the adhesive applying roller 14. When the roller 15 is elevated the gears 36, 37 are in engagement, but when the roller is dipping into the silicate supply tank, the roller 14 is an idler roller.

As containers of usual construction have end sealing flaps which are ordinarily folded in first, if the adhesive, particularly silicate, is applied clear across the surface of the side sealing flaps 39 of the container 40, silicate will drip down through the opening between the end sealing flaps and cause damage to the contents of the container. The mechanism with which my invention is embodied provides means to control the movement of the roller 14 by means of the cam rider 33 and the cam 13 so that it will be lowered into frictional and peripheral engagement with the upper surface of a side sealing flap 39 during slightly less than half of the interval which it takes for the complete length of the flap 39 to pass under the roller 14. The roller 14 is then elevated for a brief interval so that no silicate will be applied to the upper surface of the flap 39 on that portion of the area of the flap which will lie in registry with the opening between the end flaps of the container.

After a brief elevation the roller 14 is then lowered and remains in this position during the silicate applying operation.

During the interval between the passage of containers on the conveyor the roller 15 is elevated and transfers a film of silicate to the roller 14.

Referring to Figure 2, it will be noted that I have shown a silicate applying roller 41 which dips within a silicate tank 42 and applies silicate to the inner surface of sealing flaps 43 which close the opening in the container opposite the opening closed by the flaps 39. Since the fluted and knurled roller 41 can be used to apply adhesive from underneath, a silicate supply roller is not required. The roller 41 alternately dips into the tank 42 and is then elevated by means of a cam 44 which has a cam rider 45 which controls the movement of the arm 46 on which the roller 41 is journaled. The arm 46 which carries the silicate applying roller 41 is journaled in the frame as indicated at 47.

I prefer to apply the adhesive in stripes with sufficient thickness of the coating so that when the closure flaps are folded over and pressed down the silicate will spread out and occupy practically the entire surface of the closure flap with the exception of an area about the median line to which it is purposely not applied. In practice I have found the mechanism which I have heretofore described to be entirely satisfactory. The intermittent application of the silicate to the roller 14 which applies the silicate downwardly prevents the accumulation of a sufficient supply on the roller 14 to cause it to drip off on the container flap and thus spread on areas of the flap on which it is not necessary for its sealing action. When the container flap is actually passing under the roller 14 there is no support for the container flap directly underneath the part to which silicate is applied, but a guide plate 48 supports the closure flap as it is fed underneath the roller. After the application of the silicate the container is fed through the mechanism and the closure flaps are folded over in the manner usual for such sealing machines.

Having thus described my invention, what I claim as new and desire to secure by Letters Patent, is:—

1. In combination with a conveyor, means for applying a sealing material to closure flaps of a container moving on said conveyor comprising a supply of sealing material, a supply roll and an applying roll, said supply roll provided with mechanical means for moving said supply roll from a position immersed in said supply to a position peripherally engaging said applying roller.

2. In combination with a conveyor, means for applying a sealing material to closure flaps of a container moving on said conveyor comprising a supply of sealing material, a supply roll and an applying roll, said supply roll provided with mechanical means for moving said supply roll from a position immersed in said supply to a position peripherally engaging said applying roller, said applying roller having a fluted periphery with spaced knurled annular sealing medium applying portions.

3. In combination with a conveyor, means for applying a sealing material to closure flaps of a container moving on said conveyor comprising a supply of sealing material, a supply roll and an applying roll, said supply roll provided with mechanical means for moving said supply roll from a position immersed in said supply to a position peripherally engaging said applying roller, said applying roller adapted to frictionally engage the surface of a container closure flap.

4. In combination with a conveyor, means for applying a sealing material to closure flaps of a container moving on said conveyor comprising a supply of sealing material, a supply roll and an applying roll, said supply roll provided with mechanical means for moving said supply roll from a position immersed in said supply to a position peripherally engaging said applying roller, said applying roller adapted to frictionally engage the surface of a container closure flap, said mechanical means retracting said supply roller from the path of a container closure flap during the passage of said flap over said supply roller.

5. In combination with a container sealer mechanism for applying silicate in spaced bands along the upper surface of a closure flap of a container, and means for supplying silicate to said applying means, said supplying means intermittently movable into peripheral engagement with said applying means, and gears which are engaged during the peripheral engagement of said supplying means and said applying means to drive the latter during the supplying of silicate thereto.

6. In combination with a container sealer mechanism for applying silicate in spaced bands along the upper surface of a closure flap of a container, and means for supplying silicate to said applying means, said supplying means intermittently movable into peripheral engagement with said applying means, and means for moving said applying means out of contact with a portion of the area of a closure flap of a container during the application of silicate thereto.

7. In combination with a container sealer mechanism for applying silicate in spaced bands along the upper surface of a closure flap of a container, and means for supplying silicate to said applying means, said supplying means intermittently movable into peripheral engagement with said applying means, and means for moving said applying means out of contact with a portion of the area of a closure flap of a container during the application of silicate thereto comprising a bell crank arm journaling said applying means and a cam for controlling the movement of said bell crank arm.

8. In combination with the conveyor of a container sealing machine, conveying containers with their flaps extended, means above the path of the flaps for applying a sealing medium across said flaps, and means occupying said path alternatively with said flaps for supplying the medium to said applying means.

9. In combination with the conveyor of a container sealing machine, conveying containers with their flaps extended, means above the path of the flaps having a movement to and from said path for interruptedly applying a sealing medium across said flaps, and means occupying said path alternatively with said flaps for supplying the medium to said applying means.

FORESTUS REID.